(12) United States Patent
Shimomura et al.

(10) Patent No.: US 8,394,158 B2
(45) Date of Patent: Mar. 12, 2013

(54) AIR CLEANER

(75) Inventors: Chikara Shimomura, Hamamatsu (JP); Yoshitaka Koda, Hamamatsu (JP)

(73) Assignee: Roki Co., Ltd., Shizuoka (JP)

( * ) Notice: Subject to any disclaimer, the term of this patent is extended or adjusted under 35 U.S.C. 154(b) by 409 days.

(21) Appl. No.: 12/754,628

(22) Filed: Apr. 6, 2010

(65) Prior Publication Data

US 2010/0257828 A1    Oct. 14, 2010

(30) Foreign Application Priority Data

Apr. 8, 2009   (JP) .................................. 2009-093868

(51) Int. Cl.
*B01D 46/00*   (2006.01)
(52) U.S. Cl. ............. 55/385.3; 55/480; 55/493; 55/495; 55/502; 55/503
(58) Field of Classification Search ............ 55/480, 55/490, 493, 495, 497, 502–503
See application file for complete search history.

(56) References Cited

FOREIGN PATENT DOCUMENTS

| JP | 2005-036701 | | 2/2005 |
|---|---|---|---|
| JP | 2005 036701 | * | 2/2005 |
| JP | 2005-061382 | | 3/2005 |

* cited by examiner

*Primary Examiner* — Duane Smith
*Assistant Examiner* — Karla Hawkins
(74) *Attorney, Agent, or Firm* — Young & Thompson (57) ABSTRACT

An air cleaner is provided with: a case in which a filter element is housed and which has an opening; a cover that covers the opening of the case to be opened or closed; a hinge structure having a hinge formed to the cover and a hinge receiver formed to the case to be engaged with the hinge in a detachable manner such that the cover is pivotal around the hinge with respect to the case; and an engagement maintaining mechanism provided to side surfaces of the case and the cover so as to maintain the engagement between the case and the cover in a range in which the cover closes the case and in a range in which the cover is opened by a predetermined angle.

13 Claims, 6 Drawing Sheets

AIR CLEANER

BACKGROUND OF THE INVENTION

1. Field of The Invention

The present invention relates to an air cleaner, and more particularly, to an air cleaner provided with an engagement maintaining mechanism for maintaining engagement of a cover capable of improving maintenance or like workability at a time of exchanging a filter element.

2. Related Art

In a conventionally known air cleaner for an internal combustion engine, a case and a cover are mutually connected by means of hinge structure constructed by a hinge and a hinge receiver, and these members are rotated to be opened or closed.

In the air cleaner of this structure, an intake port is formed to either one of the case or cover and an exhaust port is formed to the other one thereof. The intake port and the exhaust port are constructed such that an outer edge of the filter element is held by the case and the cover so as to be communicated with each other through the filter element, which is disposed between the case and cover.

Since the filter element is provided with a function for filtrating outer (ambient) air taken into the internal combustion engine, it is necessary to periodically exchange the filter element with new one because the filtrating function becomes deteriorated for a long time use of the internal combustion engine. Such filter element exchanging working is generally performed under a condition such that the air cleaner is disposed in an engine room of an automobile in which an internal combustion engine and many other machineries or components, and under the condition, if the filter element is exchanged, in a certain case, it is impossible to visually observe the engaging condition of the hinge structure between the case and the cover, and in an adverse case, the filter element exchanging working may have been completed with the hinge structure being disengaged, which results in insufficient achievement of desired air cleaning function, thus being inconvenient.

In order to obviate such defects, there are many methods and countermeasures have been proposed such as disclosed in:

Patent Document 1: Japanese Patent Application Laid-open Publication No. 2005-36701

Patent Document 2: Japanese Patent Application Laid-open Publication No. 2005-61382

An air cleaner disclosed in the above Patent Document 1 has a case in which a filter element is housed and a cover for opening or closing an opening (opened portion) of the case. The case is provided with a receive-side engaging portion and the cover is provided with an engaging portion which is engageable with the receive-side engaging portion of the case. The engaging portion of the cover is formed with an arm projecting from an outer peripheral edge of the cover and a pivot integrally formed with the arm so as to be pivotal around the arm, and on the other hand, the receive-side engaging portion is formed with a pivot support portion for supporting the pivot and an arm support portion supporting a peripheral surface of the arm from the side opposing to the pivot support portion. The pivot support portion and the arm support portion forms a pocket into which a predetermined range of the pivot and arm is fitted into the pocket such that the predetermined range of the pivot and the arm are constrained by the pocket, and the pivot can be maintained to a predetermined position under the condition where the cover and the case are closed and are opened at a predetermined angle. The air cleaner of the Patent Document 1 has such structure as mentioned above.

On the other hand, an air cleaner disclosed in the Patent Document 2 is provided with: one case having a seal surface formed on a peripheral edge of an opening; another case detachable with respect to the opening of the one case; a filter member disposed in either one of the above two cases and having a peripheral seal portion held between seal surfaces of both the cases; a movement restricting member disposed between both the cases for restricting or limiting relative movement in a direction approximately perpendicular to an attaching (detaching) direction of both the cases; and a holding member disposed between both the cases for holding both the cases in a state holding the peripheral edge portion of the filter member.

The air cleaner of the Patent Document 2 further includes a distance restricting or limiting member, which is provided at a portion along at least an attaching (detaching) direction if both the cases of both the seal surfaces, for restricting a distance between both the seal surfaces at the time of attaching (detaching) of both the cases so as to avoid interference between the seal portion of the peripheral edge of the filter member and either one of both the cases.

However, according to the structures of the conventional air cleaners mentioned above, the hinge structure is made enlarged, thus being improper for making compact the structure of the air cleaner.

SUMMARY OF THE INVENTION

The present invention was conceived in consideration of the circumstances encountered in the prior art mentioned above, and an object thereof is to provide an air cleaner capable of surely maintaining engagement between a case and a cover at a predetermined opening angle with a compact and simple structure.

The above and other objects can be achieved according to the present invention by providing an air cleaner comprising:
a case in which a filter element is housed and which has an opening;
a cover that covers the opening of the case to be opened or closed;
a hinge structure having a hinge formed to the cover and a hinge receiver formed to the case to be engaged with the hinge in a detachable manner such that the cover is pivotal around the hinge with respect to the case; and
an engagement maintaining mechanism provided to side surfaces of the case and the cover so as to maintain the engagement between the case and the cover in a range in which the cover closes the case and in a range in which the cover is opened by a predetermined angle.

It may be desired that the engagement maintaining mechanism includes a first engaging member provided to a side surface of the cover and a second engaging member provided to a side surface of the case.

In the above embodiment, it may be desired that the first engaging member may be composed of a rib having substantially S-shape projecting from the side surface of the cover, the rib being provided with a protruded portion pivotal along a circular-arc portion with the hinge being the center of pivotal motion and an oblique surface portion extending from the protruded portion, and
that the second engaging member is composed of a rib projecting from the side surface of the case,
wherein, in the range in which the cover closes the case and in the range in which the cover is opened by the predetermined angle with respect to the case, the oblique surface portion of the first engaging member slidably contacts the second engaging member, and a distance between the pivotal center of the hinge and the second engaging member as viewed from a horizontal direction of the cover is set to be smaller than a radius of the circular-arc portion of the protruded portion of the rib of the first engaging member.

It may be also desired that the second engaging member is formed so as to have substantially U-shape and provided with an oblique portion opposing to the oblique surface portion of the first engaging member, and the protruded portion is mounted detachably along the oblique portion of the second engaging member in a state of the cover being opened by an angle more than the predetermined angle with respect to the case.

The radius of the circular-arc portion may be set to be larger than a distance between the second engaging member and the pivotal center of the hinge so that the protruded portion is pressed between the hinge receiver and the second engaging member at a time of engaging the hinge with the hinge receiver.

Further, the first engaging member may provided with a pocket portion covering the second engaging member in a state in which the cover closes the case.

It is further to be noted that the above preferred embodiments of the present invention do not include all essential features of the present invention, and many other sub-combinations of these embodiments may constitute the present invention.

According to the air cleaner of the present invention of the structures and characters mentioned above, there is provided the engagement maintaining mechanism on one or both side surfaces of the cover and the case so as to maintain the engagement between the case and the cover in a range in which the cover closes the case and in a range in which the cover is opened by a predetermined angle. Accordingly, the air cleaner can be made compact in an entire structure, thus being effective and advantageous.

The nature and further characteristic features of the present invention will be made clearer from the following descriptions made with reference to the accompanying drawings.

DESCRIPTION OF THE PREFERRED EMBODIMENT

A preferred embodiment of the present invention will be described hereunder with reference to the accompanying drawings. Further, it is to be noted that the described embodiment does not limit the invention defined in respective appended claims, and all the combination of the subject features explained in the embodiment is not essential for the solution of the present invention. It is further to be noted that terms "upper", "lower", "right", "left" and like terms showing direction are used in the present specification based on illustration of the drawings.

Figure 1:
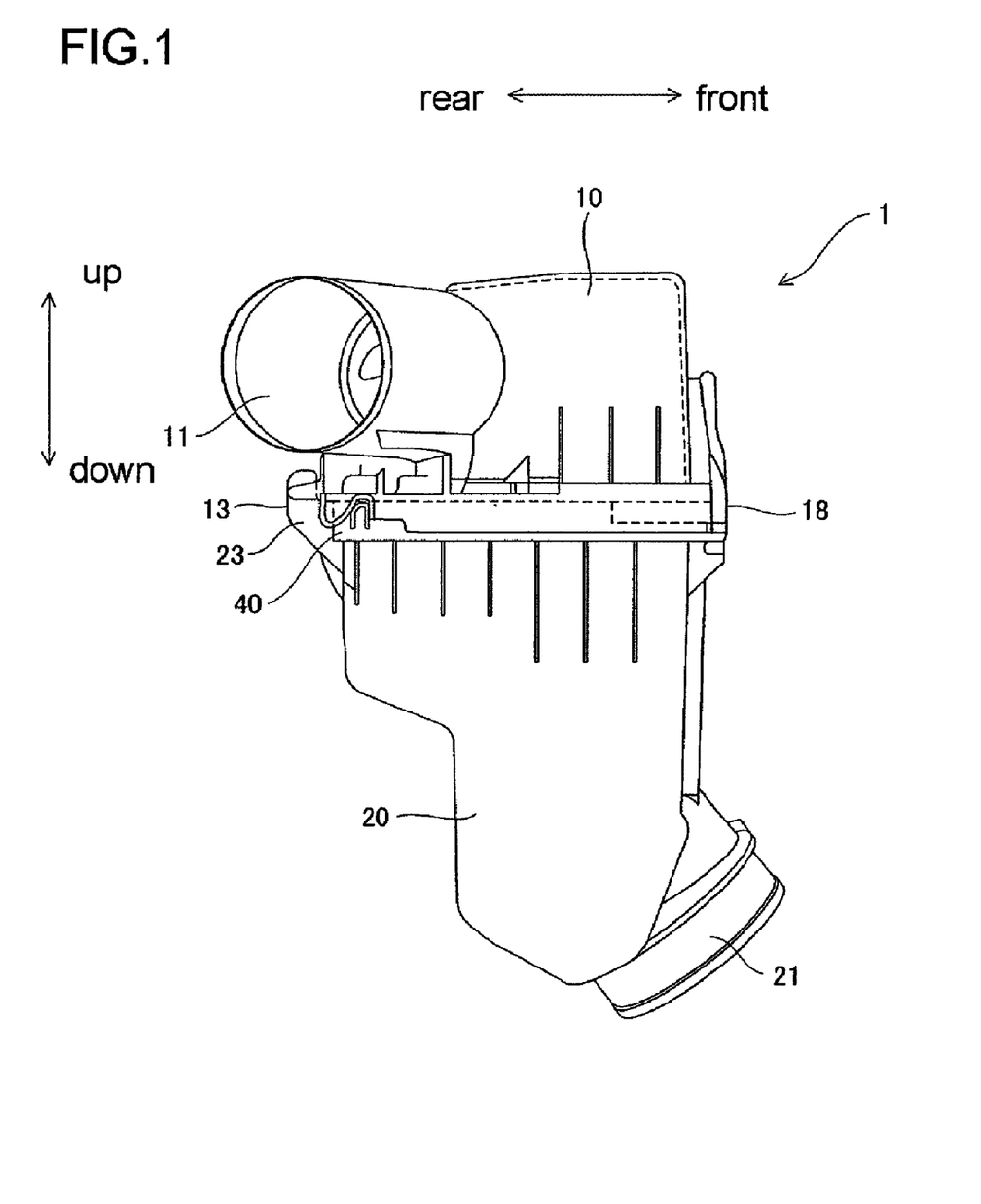
FIG. 1 is an illustration showing an entire configuration of an air cleaner according to one embodiment of the present invention.
Figure 2:
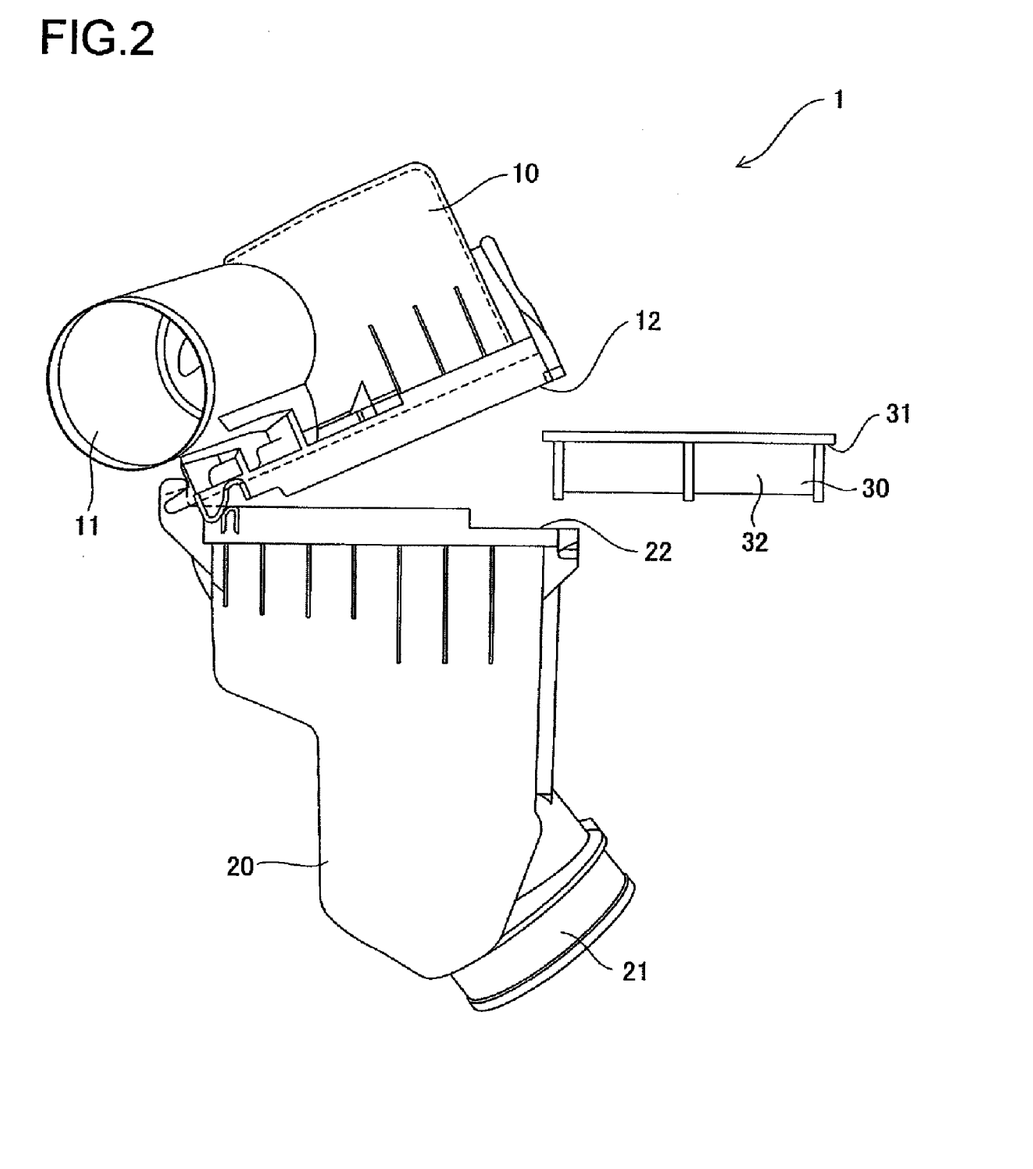
FIG. 2 is an illustration of the air cleaner shown in FIG. 1 for explaining a filter element exchanging working.

With reference to FIGS. 1 and 2, an air cleaner 1 according to an embodiment of the present invention is provided with a case 20 in which a filter element 30 is housed and a cover 10 for opening or closing an upper portion of the case 20.

The cover 10 has a bottomed cylindrical structure having an opening 12 formed to a lower side thereof, and the interior of the cover 10 and the exterior thereof are communicated through an exhaust port 11. The case 20 has a bottomed cylindrical structure having an opening 22 formed to an upper side thereof, and the interior of the case and the exterior thereof are communicated through an intake port 21.

The air cleaner 1 of the structure mentioned above takes an outside atmosphere thereinto through the intake port 21, which is then filtrated by a filter element 30 to filtrate dust or dirt contained in the outside atmosphere, and the filtrated atmosphere is exhaust through the exhaust port 11.

The opening portion 22 of the case 20 and the opening portion 12 of the cover 10 are connected by means of hinge structure in which a hinge 13 that is formed by projecting a rear surface side of the air cleaner 1 from a rear surface of the cover 10 is engaged with a hinge receiver 23 formed to the case (thus, hinge structure includes members 13 and 23).

Figure 4:
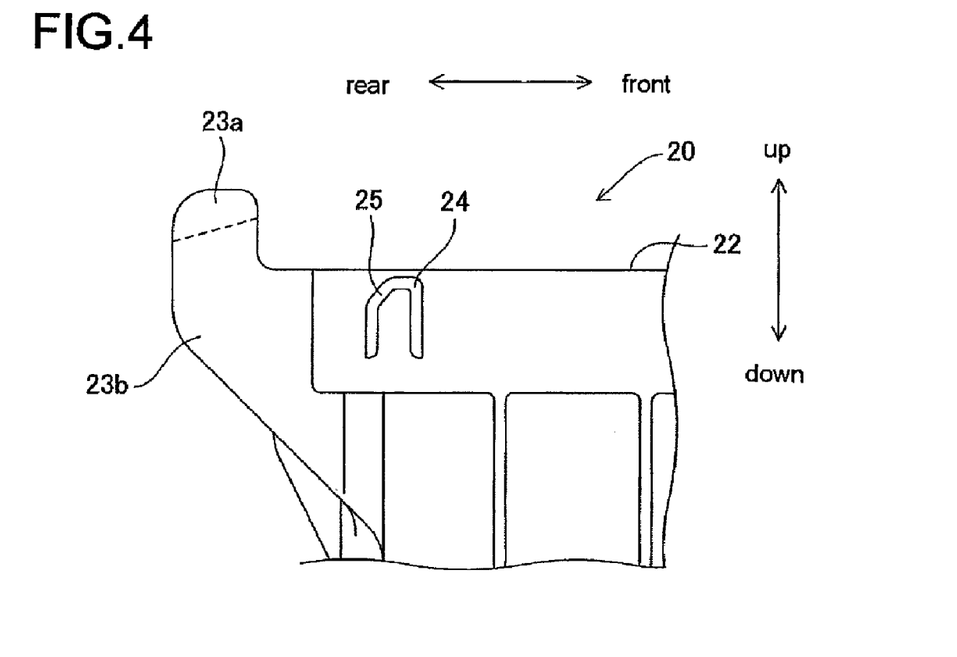
FIG. 4 is a view showing a structure of an engagement maintaining mechanism of a case according to the present embodiment.

Further, as shown in FIG. 4, the hinge receiver 23 is composed of a pair of hinge arms 23b, 23b projecting from the rear surface of the case 20 and a connection portion 23a connecting tip end portions of these hinge arms 23b, 23b, and a hinge 13 is inserted between these paired hinge arms 23b, 23b in a manner abutting against the connection portion 23, thereby constituting the hinge structure.

The cover 10 is constructed to be rotatable (pivotal) around the hinge 13 so as to be opened or closed with respect to the case 20. As mentioned hereinbefore, the hinge structure is allowed only to have a function for engaging the hinge receiver 23 with the hinge 13, so that the hinge structure possibly makes compact as far as it can maintain the strength as the hinge structure. On the other hand, on the front surface side of the air cleaner 1, a lock mechanism 18 is provided for engaging the cover 10 and the case 20 with each other and maintaining the engaged state thereof.

The filter element 30 is provided with a holder 32 having a rectangular shape, a filter member disposed inside the holder 32, and an outer edge portion 31 formed so as to project from the outer periphery of the holder 32. The projected outer edge portion 31 is mounted with a packing member for maintaining air-tight structure between the inside and outside portions of the air cleaner 1 in a state such that the packing member is held between the opening portions 12 and 22 of the cover 10 and the case 20. Further, the filter member may be formed so as to provide various shapes, to increase a filtrating surface, for example, in pleated shape.

Furthermore, the air cleaner 1 of the present embodiment is formed with an engagement maintaining mechanism 40 on its side surface so that the hinged state between the hinge structure (members 13 and 23) can be released only in a state that the cover 10 is opened by a predetermined degree of angles with respect to the case 20.

The structure or configuration of this engagement maintaining mechanism 40 will be explained hereunder with reference to FIGS. 3 to 5.

Figure 5:
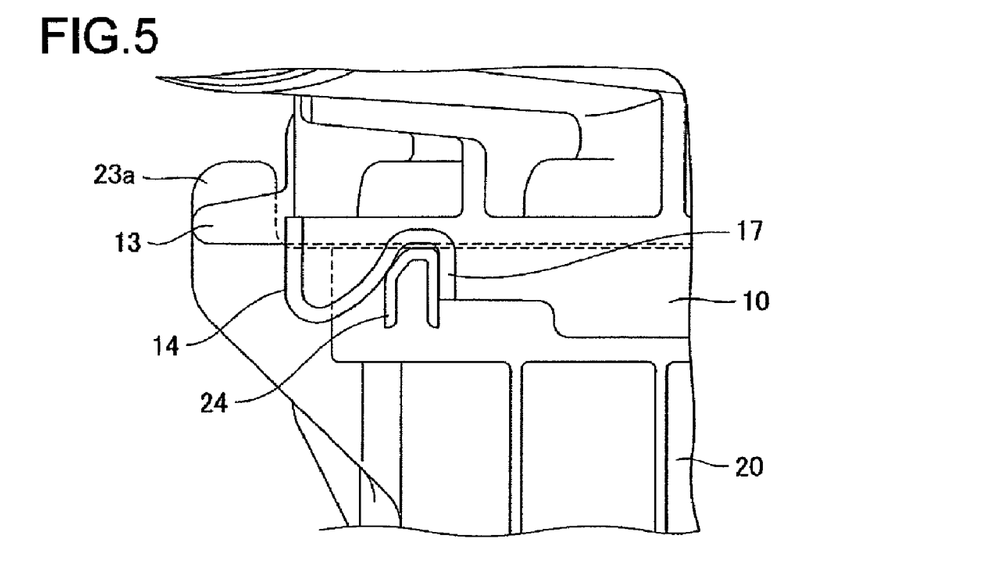
FIG. 5 is a view showing a detailed structure of the air cleaner according to the present embodiment.

As shown in FIG. 5, the engagement maintaining mechanism 40 of the air cleaner 1 of the present embodiment is provided with a first engaging member 14 formed to the cover 10 and a second engaging member 24 formed to the case 20.

Figure 3:
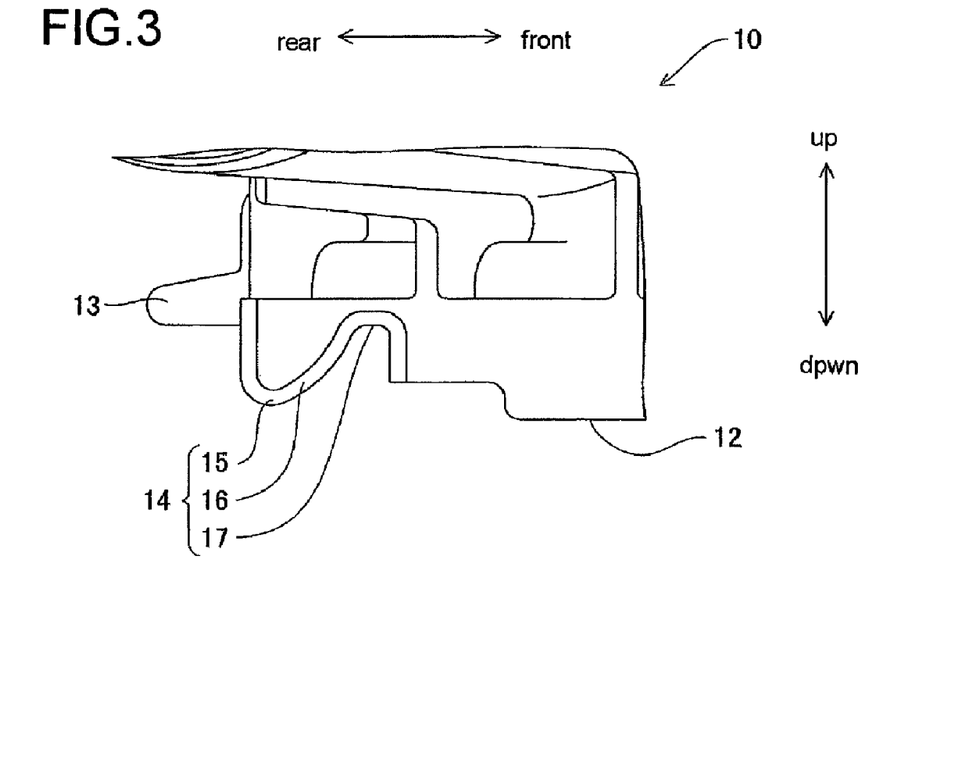
FIG. 3 is a view showing a structure of an engagement maintaining mechanism of a cover according to the present embodiment.

The first engaging member 14 is composed of a rib, as shown in FIG. 3, so as to provide approximately S-shape projecting from both side surfaces of the cover 10 on the rear surface side of the opening 12 of the cover 10. Further, the first engaging member 14 includes a protruded portion 15 projecting downward, an oblique surface portion 16 extending obliquely upward from the protruded portion 15, and a pocket portion 17 formed continuous to the oblique surface portion 16.

On the other hand, as shown in FIG. 4, the second engaging member 24 is composed of a rib projecting from both side surfaces of the case 20 so as to provide an approximately U-shape opened downward, and an oblique portion 25 is formed on the rear surface side of an upper surface thereof.

The thus formed engagement maintaining mechanism 40 of the air cleaner 1, as shown in FIG. 5, in a state in which the cover 20 closes the opening 22 of the case 10, the pocket portion 17 formed to the first engaging member 14 is assembled with the second engaging member 24 in a manner of being covered from the upper side thereof. As mentioned, by covering the second engaging member 24 by the pocket portion 17 from the upper side thereof, the cover 10 can be suppressed from being loosely engaged in a horizontal direction of the case 20, thus realizing a firm engaged condition.

Hereunder, with reference to FIGS. 6-8, function or operation of the engagement maintaining mechanism 40 of the air cleaner of the present embodiment will be described.

Figure 6:
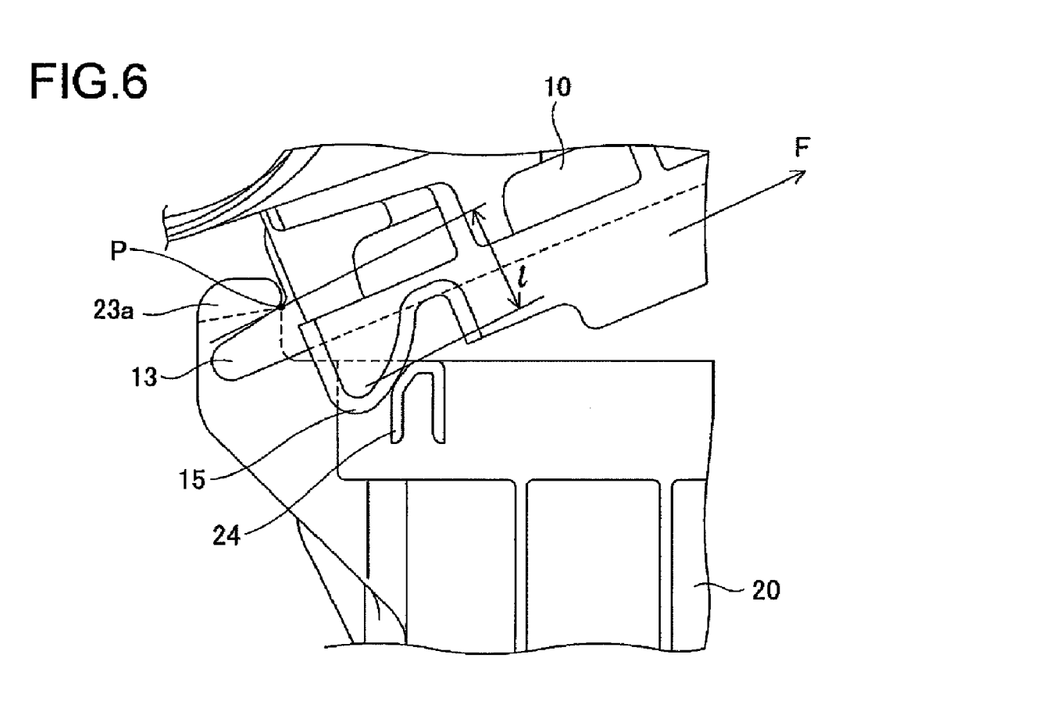
FIGS. 6 and 7 are views of the air cleaner of the present embodiment for explaining opening/closing operation thereof.

FIG. 6 shows a state in which the cover 10 shown in FIG. 5 is rotated (pivoted) to be opened by less than a predetermined angle "α". The cover 10 is rotated (pivoted) around the hinge 13, being the rotation center P, with respect to the case 20, and the protruded portion 15 of the first engaging member 14 is rotated along circular-arc portion.

In a range between the closed state of the cover 10 and the state of the cover 10 opened by the a predetermined angle "α", the first engaging member 14 rotates in slidably contact with the second engaging member 24. Furthermore, in the range between the closed state of the cover 10 and the state of the cover 10 opened by the a predetermined angle "α", a distance l between the rotation center P and the second engaging member 24 viewed from the horizontal direction F of the cover 10 is set to be smaller than a radius of the circular-arc portion of the protruded portion 15, and under this state, when the cover 10 is moved so as to be pulled out in the horizontal direction F thereof, the protruded portion 15 abuts against the second engaging member 24 to thereby prevent the hinge structure 13, 23 from being released or disengaged.

Figure 7:
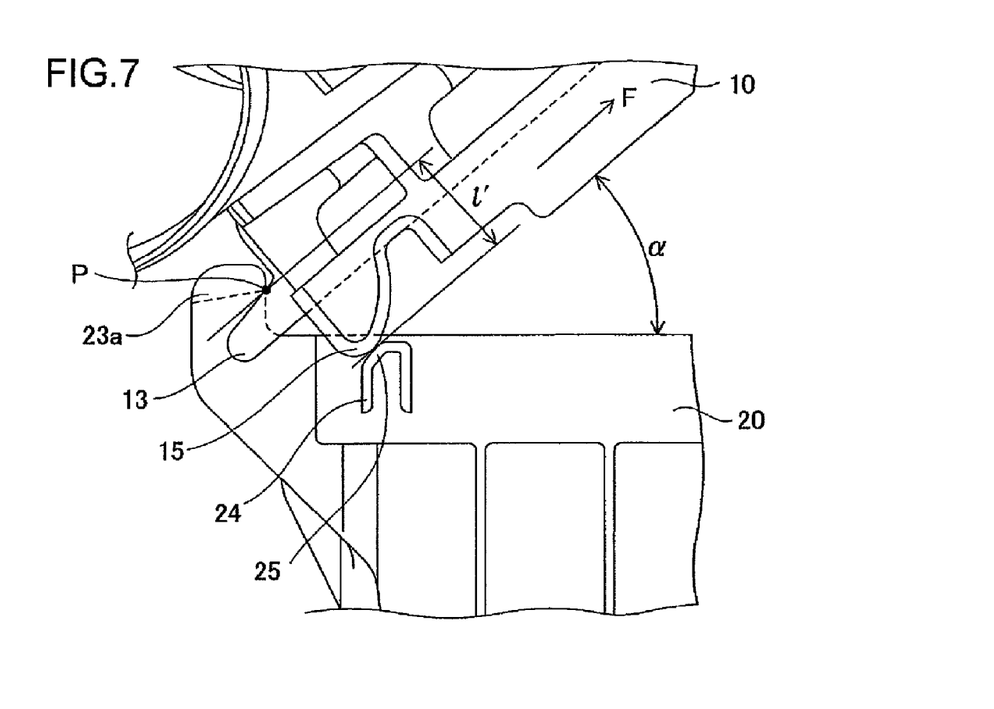
Figure 8:
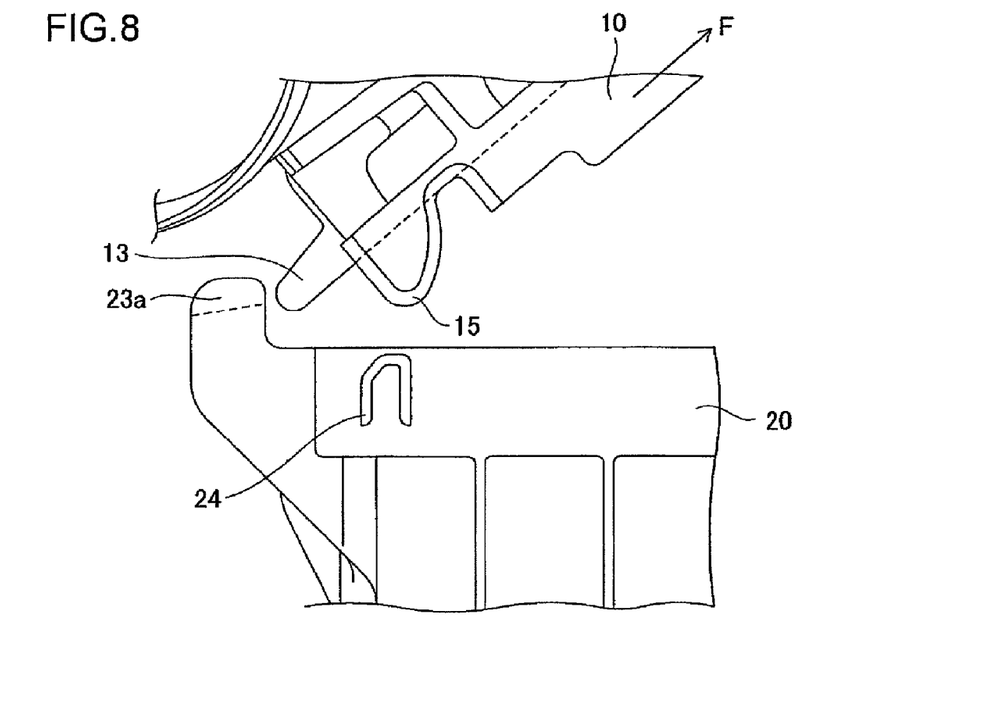
FIG. 8 is a view of the air cleaner of the present embodiment from which a hinge structure is removed.

Further, as shown in FIG. 7, in a state when the cover 10 is opened by the a predetermined angle "α", a distance l' between the rotation center P and the second engaging member 24 viewed from the horizontal direction F of the cover 10 is set to be larger than the radius of the circular-arc portion of the protruded portion 15, and under this state, when the cover 10 is moved so as to be pulled out in the horizontal direction F thereof, the protruded portion 15 moves along the oblique portion 25 to thereby release the engaged state of the hinge structure 13, 23 and to disengage the cover 10 from the case 20.

A working or process for exchanging the filter element 30 of the air cleaner 1 of the present embodiment will be performed in the following manner.

The exchanging working for the filter element 30 is generally performed in a state that the air cleaner 1 is installed in an engine room of an automobile, and as shown in FIG. 2, the filter element 30 accommodated in the case 20 is exchanged in a state that the cover 10 is opened with respect to the case 20. In this exchanging operation, since the internal combustion engine and many other machineries or components are arranged concentrically in the engine room, if the cover is forcibly opened by more than the predetermined angle "α", the cover 10 interferes the machineries or like, and hence, the cover 10 cannot be opened by an angle over the predetermined angle "α". In this state, the engaged condition of the hinge structure 13, 23 can be maintained, and accordingly, during the filter element exchanging working, the engaged condition between the hinge structure (members 13 and 23) can be maintained and the air-tightness of the air cleanser 1 can be preferably maintained, thus effectively achieving desired functions of the air cleaner 1, which is difficult in a conventional structure.

Furthermore, since the cover 10 is installed within the engine room in the state assembled with the case 20, the interference of the cover 10 with the other machineries or components in the engine room can be obviated at the assembling working of the case 20 and the cover 10, whereby the cover 10 can be assembled with the case 20 with the cover being opened by an angle more than the predetermined angle "α". In addition, since the assembling working can be done while visually observing the engaged condition between the hinge structures 13 and 23, and therefore, a problem of erroneously assembling the structure (members 13 and 23) into the engine room in the disengaged state thereof can be obviated.

Figure 9:
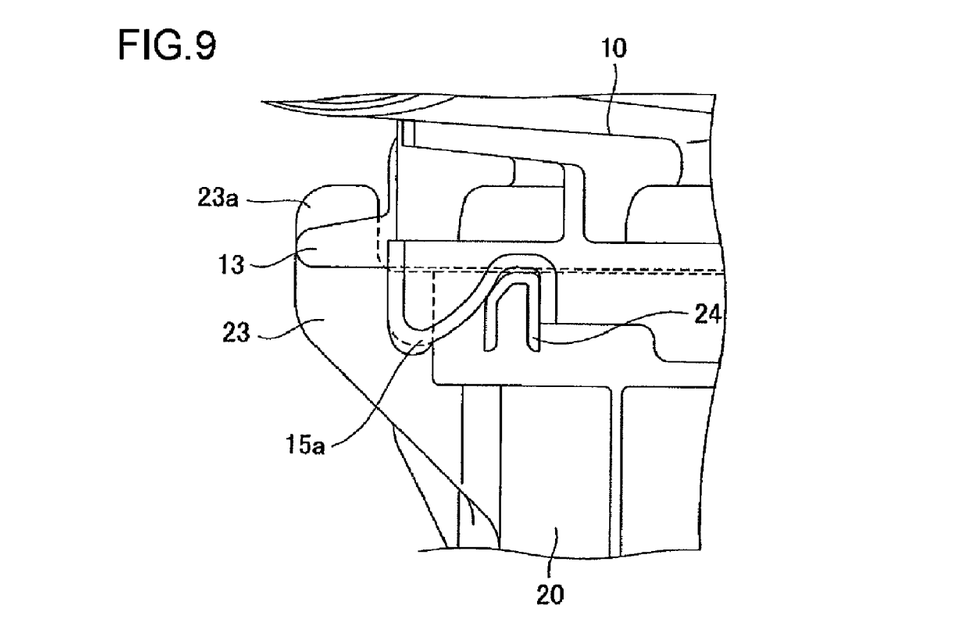
FIG. 9 is a view showing a structure similar to that of FIG. 5 according to a modified embodiment of the present invention.
Figure 10:
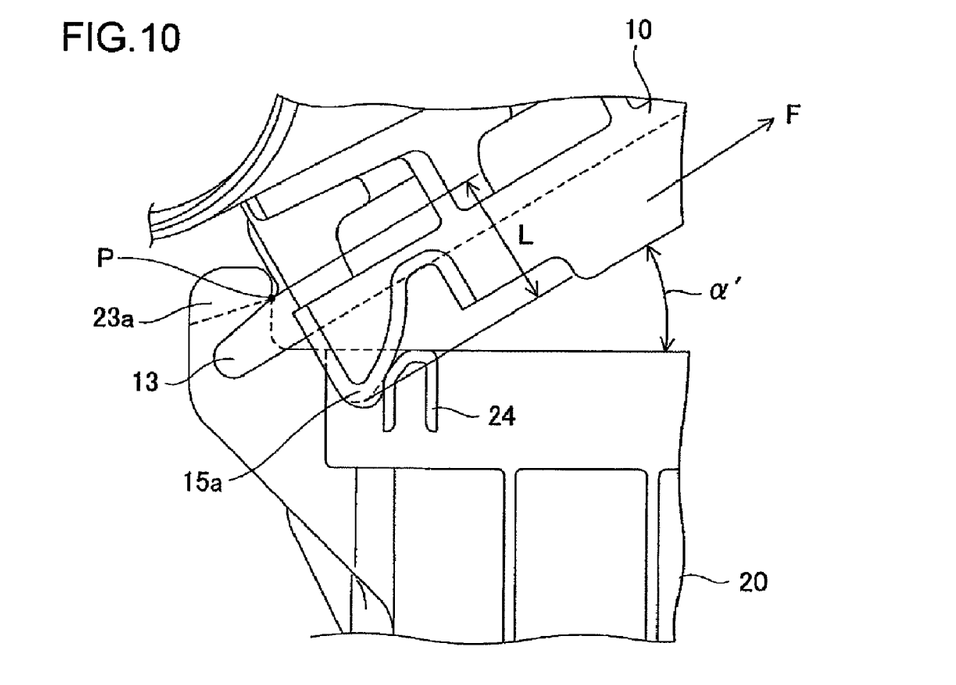
FIG. 10 is a view of the air cleaner of the modified embodiment of FIG. 9 for explaining opening/closing operation thereof.

A modified embodiment of the air cleaner 1 of the present embodiment may be further explained hereunder with reference to FIGS. 9 and 10.

In this modified embodiment of the air cleaner 1, the first engaging member 14 is provided with a protruded portion 15a in a manner such that, in a state of the cover 10 being opened at a predetermined angle "α'", a distance L between the rotation center P and the second engaging member 24 viewed in the horizontal direction F of the cover 10 is set to be smaller than the radius of the circular-arc portion of the protruded portion 15a. In the case where the protruded portion 15a is formed as mentioned above, even in the state in which the cover 10 is opened by an angle more than the predetermined angle "α'", if the cover 10 is moved so as to be pulled out in the horizontal direction F, the protruded portion 15a interferes the second engaging member 24 so as not to dismount the cover 10 from the case 20. In the manner as mentioned above, since the cover 10 is assembled with the case 20 in the manner of not being dismounted, the hinge structure 13 and 23 cannot be disengaged during the filter element exchanging working, thus providing no problem. In this case, when the cover 10 is assembled with the case 20, the protruded portion 15a is lightly pressed into the rotation center P and the second engaging member 24.

As mentioned hereinabove, according to the air cleaner 1 of the present embodiment, the engagement maintaining mechanism 40 for maintaining the engagement between the cover 10 and the case 20 in the range between the state in which the cover 10 and the case 20 are closed at the side surface of either one thereof and the range between the state in which the cover 10 is opened by the predetermined angle "α". Accordingly, the hinge structure 13 and 23 engaging the cover 10 and the case 20 can be made compact, thus the air cleaner 1 being made itself compact.

Further, it is to be noted that, in the present embodiment mentioned above, although the holder 32 of the filament element 30 is formed so as to provide a rectangular shape, the shape of the filter element 30 may accord with the shape of the air cleaner 1. Furthermore, in the present embodiment, the second engaging member 24 provides approximately U-shape, the second engaging member 24 may be formed so as to provide a columnar shape.

It is further to be noted that these and other modifications or changes may be made without departing from the technical range or scope of the pending claims of the present invention.

What is claimed is:

1. An air cleaner comprising:
    a case in which a filter element is housed and which has an opening;
    a cover that covers the opening of the case to be opened or closed;
    a hinge structure having a hinge formed to the cover and a hinge receiver formed to the case to be engaged with the hinge in a detachable manner such that the cover is pivotal around the hinge with respect to the case; and
    an engagement maintaining mechanism provided to side surfaces of the case and the cover so as to maintain the engagement between the case and the cover in a range in which the cover closes the case and in a range in which the cover is opened by a predetermined angle, wherein
    the engagement maintaining mechanism includes a first engaging member provided to a side surface of the cover and a second engaging member provided to a side surface of the case,
    the first engaging member is composed of a rib having a substantially S-shape projecting from the side surface of the cover, the rib being provided with a protruded portion pivotal along a circular-arc portion with the hinge being the center of pivotal motion and an oblique surface portion extending from the protruded portion,
    the rib includes the protruded portion projecting downward, the oblique surface portion, and a pocket portion formed continuous to the oblique surface portion,
    the second engaging member is composed of a rib projecting from the side surface of the case,
    in the range in which the cover closes the case and in the range in which the cover is opened by the predetermined angle with respect to the case, the oblique surface portion of the first engaging member slidably contacts the second engaging member, and a distance between the pivotal center of the hinge and the second engaging member as viewed from a horizontal direction of the cover is set to be smaller than a radius of the circular-arc portion of the protruded portion of the rib of the first engaging member, and
    the second engaging member is formed so as to have a substantially U-shape and provided with an oblique portion opposing to the oblique surface portion of the first engaging member, and the protruded portion is mounted detachably along the oblique portion of the second engaging member in a state of the cover being opened by an angle more than the predetermined angle with respect to the case.

2. The air cleaner according to claim 1, wherein the radius of the circular-arc portion is set to be larger than a distance between the second engaging member and the pivotal center of the hinge so that the protruded portion is pressed between the hinge receiver and the second engaging member at a time of engaging the hinge with the hinge receiver.

3. The air cleaner according to claim 1, wherein the first engaging member is provided with said pocket portion covering the second engaging member in a state in which the cover closes the case.

4. The air cleaner according to claim 1, wherein the case has a bottomed cylindrical structure.

5. The air cleaner according to claim 1, wherein an interior of the case and an exterior of the case are communicated through an intake port.

6. The air cleaner according to claim 1, wherein the cover has a bottomed cylindrical structure.

7. The air cleaner according to claim 1, wherein an interior of the cover and an exterior of the cover are communicated through an exhaust port.

8. The air cleaner according to claim 1, wherein the hinge receiver is composed of a pair of hinge arms projecting from a rear surface of the case and a connection portion connecting tip end portions of the hinge arms, and the hinge is adapted to be inserted between the paired hinge arms in a manner abutting against the connection portion.

9. The air cleaner according to claim 1, wherein on a front surface of the air cleaner a lock portion is provided to engage the cover and the case with each other.

10. The air cleaner according to claim 1, wherein the filter element is provided with a holder having a rectangular shape.

11. The air cleaner according to claim 10, wherein a filter member is disposed inside the holder, and an outer edge portion is formed so as to project from an outer periphery of the holder.

12. The air cleaner according to claim 11, wherein the projected outer edge portion is mounted with a packing member for maintaining air-tight structure between inside and outside portions of the air cleaner in a state such that the packing member is held between opening portions of the cover and the case.

13. The air cleaner according to claim 11, wherein the filter member has a pleated shape.

* * * * *